United States Patent [19]

Garner

[11] 3,945,956

[45] Mar. 23, 1976

[54] POLYMERIZATION OF STYRENE ACRYLONITRILE EXPANDABLE MICROSPHERES

[75] Inventor: Joseph L. Garner, Sanford, Mich.

[73] Assignee: The Dow Chemical Company, Midland, Mich.

[22] Filed: June 23, 1975

[21] Appl. No.: 589,323

[52] U.S. Cl............................. 260/2.5 B; 260/85.5 HC
[51] Int. Cl.² ......................... C08J 9/18; C08J 9/16
[58] Field of Search ................................. 260/2.5 B

[56] References Cited
UNITED STATES PATENTS 3,615,972  10/1971  Morehouse, Jr. ............... 260/2.5 B
3,740,359  6/1973  Garner ............................. 260/2.5 B

*Primary Examiner*—Morton Foelak
*Attorney, Agent, or Firm*—Robert B. Ingraham

[57] ABSTRACT

Expandable styrene-acrylonitrile microspheres are prepared by polymerizing a mixture of styrene and acrylonitrile with a volatile liquid blowing agent in an encapsulating system to provide expandable microspheres with a styrene-acrylonitrile polymer shell and a single drop of liquid blowing agent encapsulated symmetrically therein. Expandable microspheres of larger size, narrower size distribution and improved expansion characteristics are obtained using an alcohol in the polymerization system.

3 Claims, No Drawings

POLYMERIZATION OF STYRENE ACRYLONITRILE EXPANDABLE MICROSPHERES

Expandable synthetic resinous microspheres provide a convenient source of hollow, gas-filled synthetic resinous particles and are beneficially employed as fillers in synthetic resinous castings, as bulking agents in textiles and paper, as thin insulating coatings and the like. Such expandable particles are well known and are set forth in U.S. Pat. Nos. 3,293,114; 3,401,475; 3,479,811; 3,488,714; 3,615,972; Canadian Patent 890,501 and British Patent 1,044,680. Expandable microspheres generally have diameters within the range of 1 to 50 microns and consist essentially of a synthetic resinous thermoplastic shell encapsulating therein a single droplet of a liquid expanding agent such as a low boiling hydrocarbon or other volatile material which is generally a nonsolvent for the polymer. On heating the expandable microspheres to a temperature sufficient to cause heat plastification of the shell, the microspheres expand to form a hollow gas or vapor filled polymeric shell several times the diameter of the unexpanded microspheres. Such microspheres are prepared in an aqueous polymerization system and oftentimes dried and expanded. Styrene-acrylonitrile copolymer expandable microspheres are particularly desirable for many applications because of their solvent resistance and relatively high heat distortion temperature when compared to vinylidene chloride copolymer expandable microspheres. It is oftentimes desirable to provide expandable styrene-acrylonitrile copolymer microspheres which show desirable particle size uniformity which aids in rapid and complete expansion as well as uniformity of texture where expandable microspheres or expanded microspheres are employed in coatings, moldings and the like. Oftentimes when expandable styrene-acrylonitrile microspheres are prepared, the microspheres are undesirably small, have an undesirably broad particle size distribution and oftentimes expand to a less than desired bulk density.

It would be desirable if there were available an improved method for the preparation of styrene-acrylonitrile expandable microspheres.

It would also be desirable if there were available an improved method of preparation of styrene-acrylonitrile expandable microspheres of larger particle size.

It would also be desirable if there were available an improved expandable thermoplastic styrene-acrylonitrile microsphere having increased particle diameter and a relatively narrow particle size distribution.

These benefits and other advantages in accordance with the present invention are achieved in a method for the preparation of expandable styrene-acrylonitrile microspheres, wherein the styrene-acrylonitrile microspheres comprise a generally hollow spherical shell of a copolymer of from about 50–80 parts by weight styrene and from about 50–20 parts by weight of acrylonitrile, from 10–50 parts by weight of a volatile liquid blowing agent which on heating, boils under atmospheric pressure at a temperature below the glass temperature of the polymer shell wherein styrene, acrylonitrile, volatile fluid foaming agent, a free radical polymerization initiating catalyst, a suspending agent suitable for an encapsulating polymerization system and an aqueous suspending medium are admixed to provide a dispersion of droplets containing styrene, acrylonitrile and volatile fluid foaming agent are dispersed within the aqueous suspending medium, causing free radical polymerization of the styrene and acrylonitrile to form expandable styrene-acrylonitrile microspheres, the improvement which comprises employing from about one-half to about 10 parts by weight per 100 parts by weight of water, in the suspending medium, of a hydroxyl containing compound of the formula:

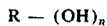

wherein R is an alkyl radical containing up to about 6 carbon atoms and $n$ is an integer of from 1–4 inclusive.

Encapsulating polymerization systems are well known and are set forth in U.S. Pat. No. 3,615,972, the teachings of which are herewith incorporated by reference thereto. The present invention is readily employed with any polymerizing encapsulating system which provides sytrene-acrylonitrile expandable microspheres.

Hydroxyl containing compounds suitable for use in the practice of the present invention include those compounds having the formula:

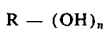

wherein R is an alkyl radical containing from one to six carbon atoms and $n$ is an integer from 1–4 inclusive. Such compounds include methanol, ethanol, propanol, butanol, pentanol, hexanol and isomers thereof. Also desirably employed in the practice of the present invention are dihydric alcohols such as ethylene glycol; 1,2-propylene glycol; 1,3-propylene glycol; 1,2-butanediol; 1,4-butanediol; 1,3-butanediol and all pentanediols are eminently satisfactory as are the hexanediols. Trihydroxy compounds are also suitable for the practice of the present invention and include glycerine; 1,2,4-trihydroxy butane; 1,2,5-trihydroxy pentane and all isomers of trihydroxy propane. Partial esters of polyhydroxy compounds are also suitable such as 1-hydroxy, 2-methoxy propane; 1,2-hydroxy, 3-methoxy propane and the like.

A wide variety of blowing or raising agents may be incorporated within the polymerization system. They can be volatile fluid-forming agents such as aliphatic hydrocarbons including ethane, ethylene, propane, propene, butene, isobutene, neopentane, acetylene, hexane, heptane, or mixtures of one or more such aliphatic hydrocarbons having a molecular weight of at least 26 and a boiling point below the range of the softening point of the styrene-acrylonitrile polymer when saturated with the particular blowing agent utilized.

Other suitable fluid-forming agents are the chlorofluorocarbons such as:

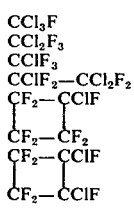

and tetraalkyl silanes such as tetramethyl silane, trimethylethyl silane, trimethylisopropyl silane and trimethyl n-propyl silane. The boiling point of such foaming agents at atmospheric pressure should be about the same temperature range or lower than the softening point of the styrene-acrylonitrile polymer.

Suitable suspending agents and methods for determining the suitability of suspending agents for encapsulating polymerization are set forth in U.S. Pat. No. 3,615,972.

Generally, in the practice of the present invention, the greater diameter of the expandable microsphere and the narrower particle size range desired, the greater the amount of hydroxyl containing compound will be employed. Usually when the hydroxyl containing compound is added to any particular styrene-acrylonitrile encapsulating polymerizing system, the total range of particle diameter will decrease and the number average particle size will increase. As additional hydroxyl containing compound is added, the diameter of the resultant particles increases and the percent of particle diameter spread decreases.

The following examples are illustrative and should not be considered as limiting:

EXAMPLE 1

A container is charged with 100 parts by weight of deionized water, 12 parts by weight of a 30 weight percent colloidal silica dispersion in water; the colloidal silica dispersion is a 30 weight percent solvent and is commercially available under the trade name Ludox HS. To this mixture is added 0.6 parts by weight of a 10 weight percent aqueous solution of a copolymer prepared from diethylamine and adipic acid. Diethylamine and adipic acid are employed in equal portions and a condensation reaction is carried out to provide a product having a viscosity of about 100 centipoise at a temperature of 25°C. 0.1 part by weight of potassium dichromate is added to the aqueous phase as a water phase polymerization inhibitor. Two parts by weight of sodium chloride are also included within the water phase, the pH of the aqueous solution is adjusted to 4 employing hydrochloric acid. An oil phase mixture is prepared by admixing 30 parts by weight styrene, 20 parts by weight acrylonitrile and 0.043 part by weight of a mixture of diethylbenzene and divinylbenzene which contains 55 weight percent of divinylbenzene, 12.5 parts by weight isobutane and 0.15 parts by weight of secondary butyl peroxydicarbonate. The oil phase mixture is added to the water phase with violent agitation supplied by a blade rotating at a speed of about 10,000 r.p.m. in the container of a household blender. A major portion of the resultant suspension is added to a citrate bottle which is immediately capped. A sample of the reaction mixture is determined to have a particle size of from about 3–15 microns. The citrate bottle containing the reaction mixture is tumbled in a water bath at a temperature of 50°C. for a period of 24 hours. At the end of 24 hours, the bottle is cooled, opened and the solid reaction product partially separated from the suspending medium by filtration. The product is then air dried in a circulating air oven at a temperature of 35°C. A portion of the dry microspheres is examined under a light microscope and the particle size determined. While under the microscope, the sample is heated by the means of a hot stage and the proportion of the microsphere expanding is estimated and the range of expanded particle size determined. The particle size of the unexpanded particles ranges from about 6 to about 16 microns. On heating, about one-half of the particles expanded. Employing the foregoing procedure with the exception that two parts by weight of methanol were added, the resultant expandable particles had diameters ranging from 9–11 microns and on heating; all particles expanded.

EXAMPLE 2

The procedure of Example 1 is repeated with the exception that 5 parts by weight of methanol are employed, the resultant particles have diameters ranging from about 24 to about 27 microns. When heated, all of the particles expanded.

EXAMPLE 3

The procedure of Example 1 is repeated with the exception that in place of methanol, 2 parts by weight of normal butanol are employed. The particle size of the expandable microspheres is 10–12 microns and on heating, all particles expanded.

EXAMPLE 4

The procedure of Example 1 is repeated with the exception that 2 parts by weight of normal propanol are employed in place of methanol. The particle size range of the expandable microspheres is 19–23 microns and on heating, all particles expanded.

EXAMPLE 5

The procedure of Example 1 is repeated employing 2 parts by weight of methanol and 20 parts by weight of neopentane in place of the isobutane. On heating, the microspheres expanded to an apparent true density of 2.4 pounds per cubic foot. For purposes of comparison, the procedure is repeated without methanol. The particles expanded to provide a product having an apparent true density of 8.3 pounds per cubic foot.

In a similar manner, other styrene-acrylonitrile expandable microspheres are randomly prepared employing the hereinbefore delineated sytrene-acrylonitrile composition range with the blowing agents set forth and hydroxyl containing additives hereinbefore delineated.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. In a method for the preparation of expandable styrene-acrylonitrile microspheres, wherein the styrene-acrylonitrile microspheres comprise a generally hollow spherical shell of a copolymer of from about 50–80 parts by weight styrene and from about 50–20 parts by weight of acrylonitrile, from 10–50 parts by weight of a volatile liquid blowing agent which on heating, boils under atmospheric pressure at a temperature below the glass temperature of the polymer shell wherein styrene, acrylonitrile, volatile fluid foaming agent, a free radical polymerization initiating catalyst, a suspending agent suitable for an encapsulating polymerization system and an aqueous suspending medium are admixed to provide a dispersion of droplets containing styrene, acrylonitrile and volatile fluid foaming agent are dispersed within the aqueous suspending medium, causing free radical polymerization of the styrene and acrylonitrile to form expandable styrene-acrylonitrile microspheres, the improvement which comprises employing from about one-half to about 10 parts by weight per 100 parts by weight of water, in the suspending medium, of a hydroxyl containing compound of the formula:

$$R - (OH)_n$$

wherein R is an alkyl radical containing up to about 6 carbon atoms and $n$ is an integer of from 1–4 inclusive.

2. The method of claim 1 wherein the hydroxyl containing compound is methanol.

3. The method of claim 1 wherein the hydroxyl containing compound is butanol.

* * * * *